United States Patent
Atsuta et al.

(10) Patent No.: US 7,732,757 B2
(45) Date of Patent: *Jun. 8, 2010

(54) ORIGIN DETECTION METHOD FOR OPTICAL ENCODER

(75) Inventors: Akio Atsuta, Yokosuka (JP); Masahiko Igaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/193,208

(22) Filed: Aug. 18, 2008

(65) Prior Publication Data

US 2009/0050794 A1 Feb. 26, 2009

Related U.S. Application Data

(62) Division of application No. 11/854,941, filed on Sep. 13, 2007, now Pat. No. 7,425,697.

(30) Foreign Application Priority Data

Sep. 22, 2006 (JP) ............................. 2006-257199

(51) Int. Cl.
*G01D 5/36* (2006.01)
*H03M 1/22* (2006.01)

(52) U.S. Cl. .................................... 250/237 G; 341/13
(58) Field of Classification Search ................
250/231.13–231.18, 237 R, 237 G; 341/11, 341/13, 14
See application file for complete search history.

(56) References Cited

U.S. PATENT DOCUMENTS

| | | | | |
|---|---|---|---|---|
| 5,359,193 | A | 10/1994 | Nyui et al. | 250/237 G |
| 5,481,106 | A | 1/1996 | Nyui et al. | 250/237 G |
| 5,483,059 | A | 1/1996 | Igaki et al. | 250/231.16 |
| 5,929,789 | A | 7/1999 | Barbehenn | 341/11 |
| 6,639,207 | B2 | 10/2003 | Yamamoto et al. | 250/231.14 |
| 6,674,066 | B1 | 1/2004 | Kaneda et al. | 250/231.13 |
| 6,891,150 | B2 | 5/2005 | Takayama et al. | 250/231.13 |
| 7,282,699 | B2 | 10/2007 | Atsuta et al. | 250/231.13 |
| 2005/0274880 | A1 | 12/2005 | Atsuta et al. | 250/231.13 |

FOREIGN PATENT DOCUMENTS

| JP | 6-056304 | 7/1994 |
|---|---|---|
| JP | 10-318790 | 12/1998 |
| JP | 2003-161645 | 6/2003 |

*Primary Examiner*—Que T Le
*Assistant Examiner*—Jennifer Bennett
(74) *Attorney, Agent, or Firm*—Fitzpatrick, Cella, Harper & Scinto

(57) ABSTRACT

An optical encoder equipped with an origin detection apparatus has a scale provided with an optical grating, a plurality of light receiving elements that is provided in association with the pitch of the optical grating and movable relative to the scale and a light source that illuminates the light receiving elements with light through the scale. An optically discontinuous portion is provided in the optical grating of the scale, a change of a light beam that occurs over a certain length of section at the time when a light beam corresponding to the discontinuous portion is incident on the light receiving elements, a change occurring in that section is detected, calculation is performed, and an origin position is detected from the result of the calculation.

4 Claims, 10 Drawing Sheets

ORIGIN DETECTION METHOD FOR OPTICAL ENCODER

BACKGROUND OF THE INVENTION

1. Field of the Invention

The present invention relates to an origin detection method for an optical encoder that is used in displace measurement or angle measurement.

2. Description of the Related Art

A photoelectric encoder has a main scale on which a first optical grating is provided and an index scale opposed thereto on which a second optical grating is provided. The photoelectric encoder further has a light source that illuminates the main scale with light and a light receiving element that receives light having been transmitted through or reflected by the optical grating of the main scale and transmitted through the optical grating of the index scale.

Japanese Patent Publication No. H06-056304 teaches use of a light receiving element array that also functions as an index scale in a photoelectric encoder of the above described type. The inventors of the present invention have also filed patent applications, e.g. Japanese Patent Application Laid-Open No. 2003-161645, on inventions concerning encoders of the above described type.

The encoder having the above described structure is called an incremental type encoder. This type of encoder detects the movement amount of a scale by counting the number of output pulses generated by movement of the scale. A problem encountered with the incremental type encoder is that the absolute position in the rotational angle cannot be determined, and it is required, in some cases, to provide an additional separate sensor to detect the absolute position.

As a solution to this problem, the following system has been developed. FIG. 16 shows a scale disclosed in Japanese Patent Application Laid-Open No. H10-318790, in which the transmittance of the pattern on the scale 1 is varied to enable to detect the absolute position in an incremental type encoder. In this scale, mark 1a has a transmittance of 1, and transmittances of marks 1b, 1c, 1d . . . gradually decrease.

FIG. 17 shows changes in signals that occur when a portion of the scale 1 in which the transmittance varies passes by a sensor in an encoder having this scale 1. Signals A and B are analogue two phase signals obtained from the sensor.

The amplitude of the signals decreases with a gradual decrease in the transmittance of the mark of the scale 1, and the absolute position can be detected by detecting this change in the signal amplitude.

In an absolute position detection unit used in the above described conventional encoder, in order to detect the signal amplitude, it is required to sample signals at intervals significantly shorter than a cycle of the encoder signals obtained.

Since it is necessary to determine the peak voltage and valley voltage of the signals based on the result of sampling, a large scale circuit such as a high speed A/D converter is required to be provided.

In addition, it is difficult to produce a scale including portions having different transmittances with reliability, and significant variations in actual changes in the signal amplitude will be generated.

An object of the present invention is to provide an origin detection method for an optical encoder that enables origin detection with a simple structure by performing computation according to changes in the sensor signal with movement of a scale.

SUMMARY OF THE INVENTION

To achieve the above object, according to the present invention, there is provided an origin detection method for an optical encoder technically characterized in that the optical encoder has a scale provided with an optical grating, a plurality of light receiving elements that is provided in association with the pitch of the optical grating and movable relative to the scale and a light source that illuminates the light receiving elements with light through the scale, wherein an optically discontinuous portion is provided in the optical grating of the scale, a change of a light beam that occurs over a certain length of section at the time when a light beam corresponding to the discontinuous portion passes through the light receiving elements, a change occurring in that section is detected, calculation is performed, and an origin position is detected from the result of the calculation.

According to the origin detection method for an optical encoder according to the present invention, in detecting the absolute position, the origin position can be determined by detecting a point of change in an analogue middle voltage based on a relationship between the number of units of the light receiving portion and the discontinuous portion of the scale.

According to the arrangement of the present invention, since an encoder signal and an origin signal are synchronous signals obtained from the same scale, a highly accurate origin signal can be produced. Furthermore, no additional parts are needed to detect the origin, and accordingly, encoders having an origin position detection function can be manufactured at low cost.

Further features of the present invention will become apparent from the following description of exemplary embodiments with reference to the attached drawings.

DESCRIPTION OF THE EMBODIMENTS

In the following, the present invention will be described based on embodiments illustrated in FIGS. 1 to 15.

First Embodiment

Figure 1:
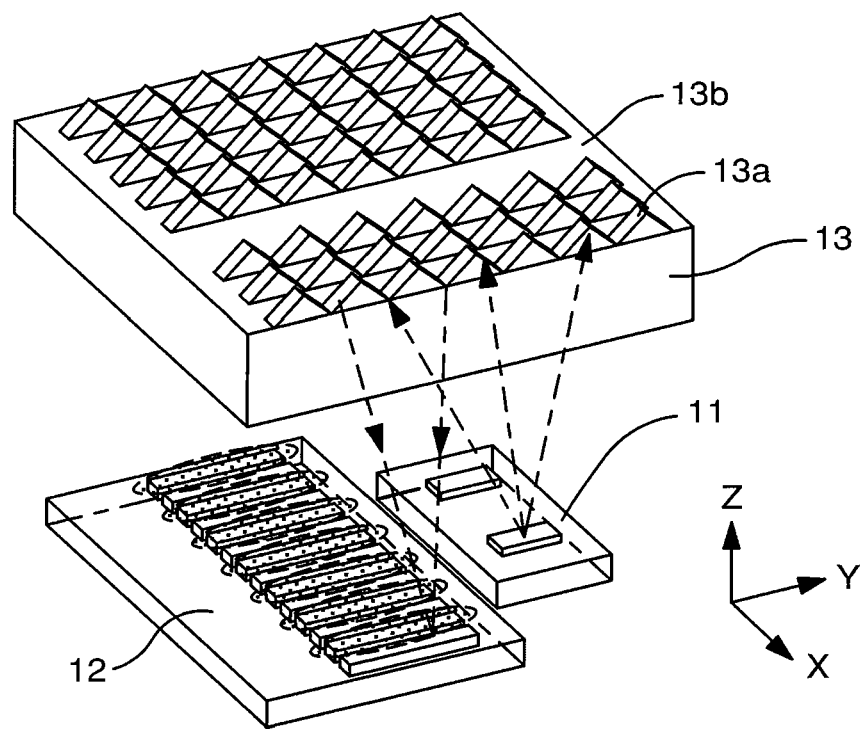
FIG. 1 schematically illustrates the structure of an optical encoder according to a first embodiment.

FIG. 1 schematically shows the structure of an encoder that uses a micro roof mirror array as a reflective scale. The encoder has a light emitting portion 11, a light receiving portion 12 and a scale 13 as a moving member. Light emitted from the light emitting portion 11 is reflected by the scale 13 that has a reflexive portion 13a and an irreflexive portion 13b, so that a light-and-shade distribution pattern is formed on an array of photodiodes 14 serving as light receiving elements in the light receiving portion 12 shown in FIG. 2.

FIG. 1 shows only a part of the scale 13. Actually, the scale 13 is long in its moving direction and has a region 13a in which reflexive portions and irreflexive portions are arranged at a certain cycle and a partial region 13b in which a reflexive portion is absent.

The scale 13 is not necessarily required to have micro roof mirror array, but it may be a simple structure having reflexive portions and irreflexive portions.

Figure 2:
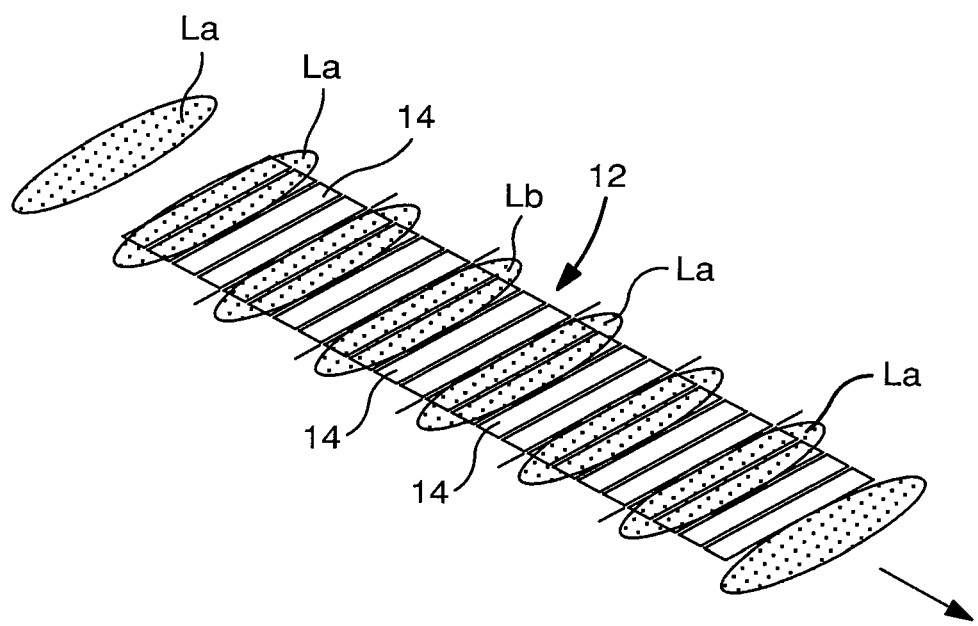
FIG. 2 illustrates a pattern of a light receiving portion and a light-and-shade pattern detected.

The light receiving portion 12 shown in FIG. 2 has a plurality of units, each of which includes four photodiodes 14. The length of the unit including four photodiodes 14 corresponds to the length of one light-and-shade cycle of the scale 13. The light receiving portion 12 shown in FIG. 2 has six units. By performing computation based on signals obtained from the four photodiodes 14, two phase sinusoidal signals having a phase difference of 90 degrees can be obtained.

High intensity portions La of the light incident on the light receiving portion 12 from the scale 13 are distributed in a specific relation with respect to the scale pitch. Thus, there is a high light intensity portion La in one unit in the light receiving portion 12. In this embodiment, since the irreflexive portion 13b is provided on the scale 13, a low light intensity portion Lb is generated among the high light intensity portions La.

According to this structure, even when one unit in the light receive portion does not receive the reflected light due to the presence of the irreflexive portion 13b on the scale 13, there are several photodiodes 14 that receive the reflected light in the other units, and signals having a certain decreased amplitude are obtained. In this embodiment, for example, the light receiving portion 12 is adapted to receive six high light intensity portions La, and one of the six high light intensity portions is absent. Therefore, a light quantity equal to five sixths of the normal light quantity is obtained. Corresponding photodiodes in the respective units may be interconnected so that an added-up signal is output, or a circuit that adds up the signals output from those photodiodes may be provided.

Figure 3:
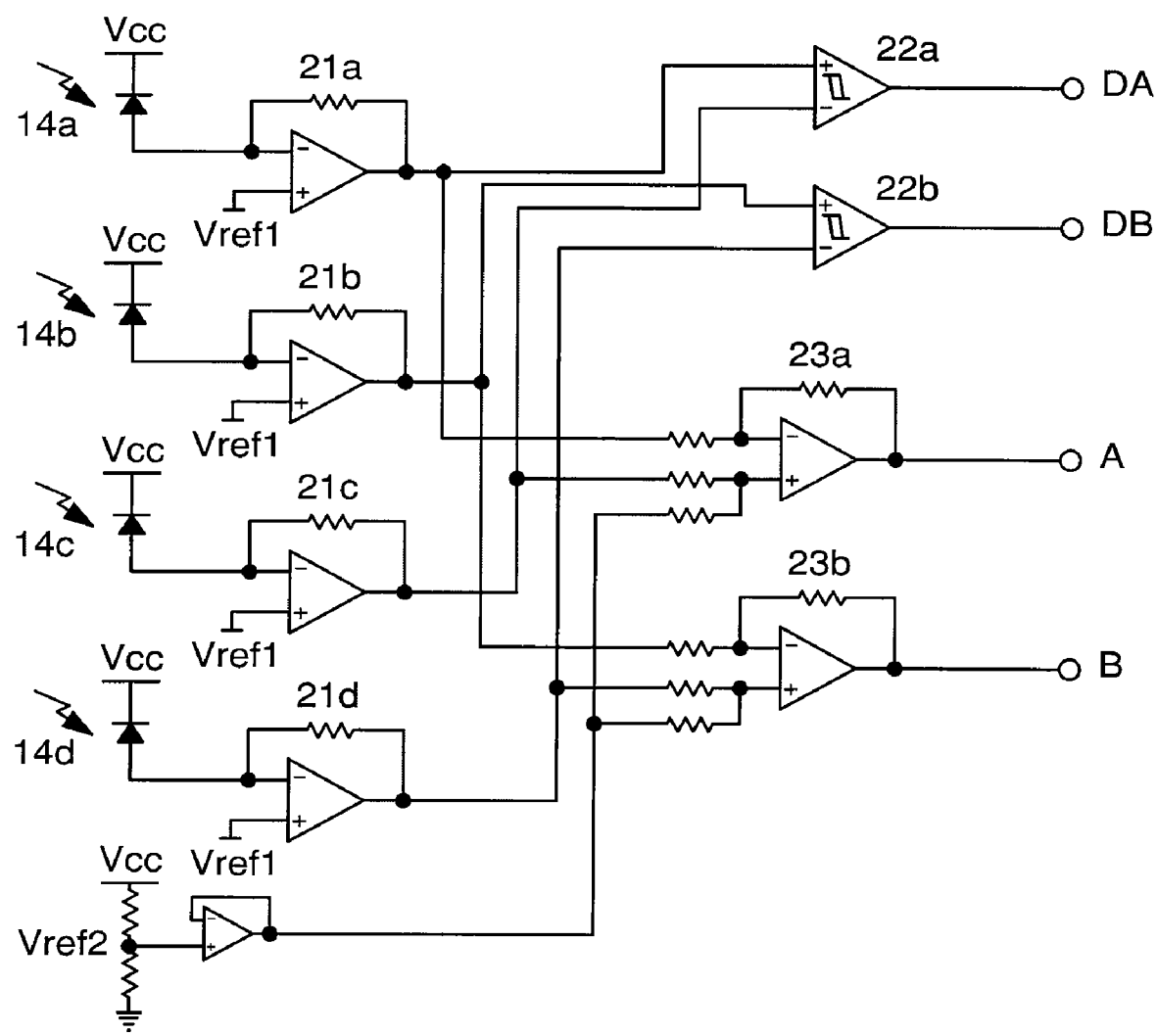
FIG. 3 is a circuit diagram of a processing circuit.

FIG. 3 is a circuit diagram of a processing circuit in this embodiment. The processing circuit has current-to-voltage converters provided downstream of the four photodiodes 14a to 14d in one unit respectively. The photodiodes 14a to 14d output signals having phase differences of 90 degrees from one another.

Signals from photodiodes 14a and 14c and signals from photodiodes 14b and 14d have phase differences of 180 degrees respectively. These signals are input to analogue amplifiers 21a to 21d. The outputs of the analogue amplifiers 21a to 21d are input to the plus and minus terminals of comparators 22a and 22b so as to be binarized. Thus, an A-phase digital signal DA and a B-phase digital signal DB are output.

The outputs of the analogue amplifiers 21a to 21d are connected to differential amplifiers 23a and 23b, and a voltage Vref2 is applied to the differential amplifiers 23a and 23b. Therefore, an A-phase analogue signal A and a B-phase analogue signal B in which the voltage Vref2 is the central voltage in the analogue signals A and B are output. With the above described circuit configuration, digital signals that change at central points of the analogue signals are obtained.

Figure 4:
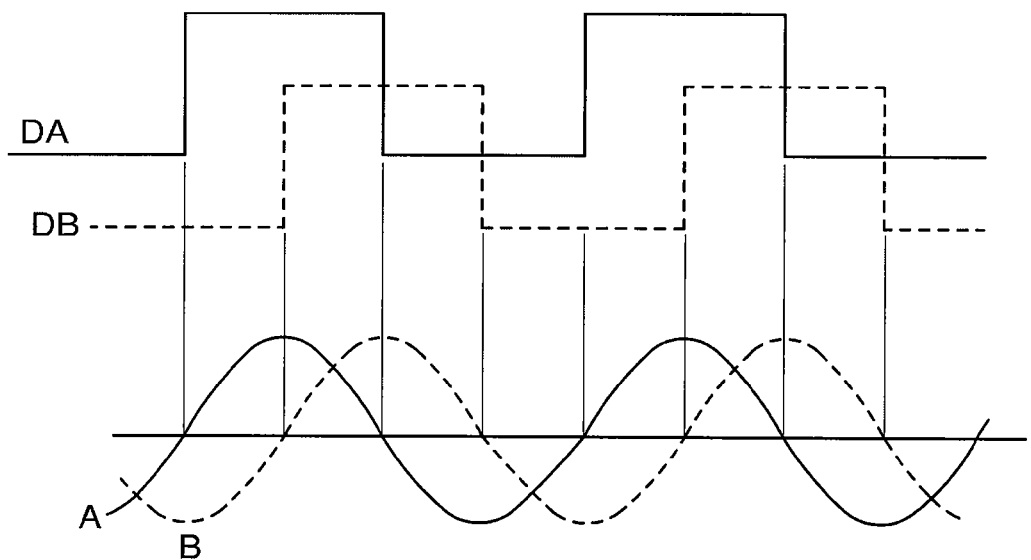
FIG. 4 shows waveforms of digital signals and analogue signals obtained.

FIG. 4 shows waveforms of signals obtained from this circuit. Since the digital signals DA, DB are generated at zero crossing points of the analogue signals A, B, and the phases of the analogue signals A and B are different from each other by 90 degrees, rising edges and trailing edges of the B-phase digital signal DB coincide with times at which the A-phase analogue signal A becomes maximum and minimum.

Therefore, by sampling the A-phase analogue signal A at timings of pulse edges of the B-phase digital signal DB, the maximum value and the minimum value of the A-phase analogue signal A in one cycle thereof can be obtained. The amplitude of the A-phase analogue signal A and the middle voltage of the A-phase can be obtained by the following equations based on the maximum value Amax and the minimum value Amin.

$$\text{Amplitude} = A\text{max} - A\text{min}$$

$$\text{Middle Voltage} = (A\text{max} + A\text{min})/2$$

Figure 5:
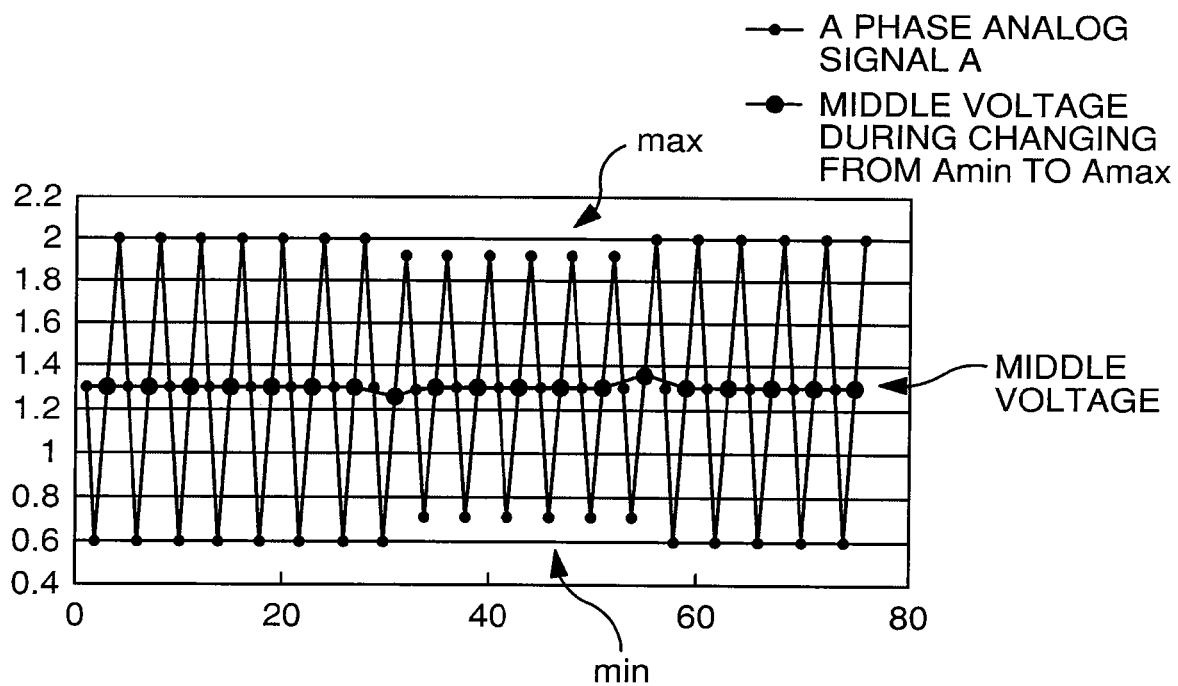
FIG. 5 is a graph showing changes in a signal at a time when a deficient slit passes by, which is detected by the processing circuit, and result of calculation.

FIG. 5 shows a detection signal of the value of the A-phase analogue signal A obtained by using the light receiving portion 12 in FIG. 2 at timings of rising and trailing edges of the digital signals DA, DB in a case where the width of the irreflexive portion 13b on the scale 13 is equal to the width of one slit.

Four signals that are sampled at timings of rising and trailing edges of the digital signals DA, DB are obtained in one cycle.

For example, in the case of a rotary type scale 13 which generates one thousand pulses per one rotation, a thousand sets of four signals are obtained by one unit per one rotation of the scale 13, namely, four thousand data are detected in total.

In FIG. 5, the amplitude (Amax−Amin) is relatively small over 6 cycles.

This occurs when the irreflexive portion 13b of the scale 13 passes by the light receiving portion 12. Normally, a light-and-shade pattern corresponding to six pitches is formed on the light receiving portion 12. In the above case, however, a portion of the scale equal to one pitch (or the irreflexive portion 13b) does not reflect light, and therefore the signal amplitude decreases to ⅚ of that in the normal time.

In FIG. 5, the middle voltages A or (Amin+Amax)/2 of the A-phase analogue signal A while the signal value changes from the minimum value Amin to the maximum value Amax are plotted as black dots.

Figure 6:
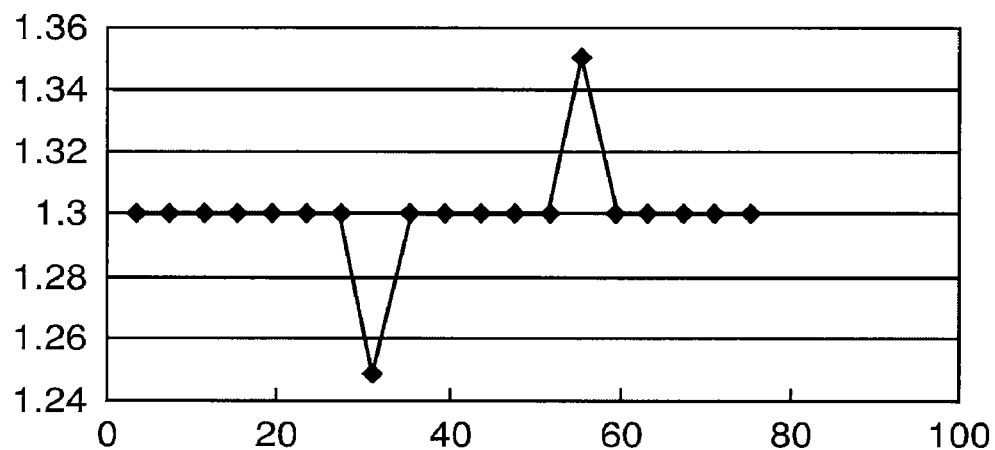
FIG. 6 is a graph showing changes in middle voltage.

FIG. 6 shows the middle voltage in an enlarged manner. The middle voltage increases or decreases at a moment when the irreflexive portion 13b of the scale 13 passes by the light receiving portion 12. When the irreflexive portion 13b passes from analogue-signal-A side (passes from the photodiode 14a toward the photodiode 14d in FIG. 3), a decrease in the middle voltage occurs. On the other hand, when the irreflexive portion 13b passes from analogue-signal-A side (passes from the photodiode 14d toward the photodiode 14a in FIG. 3), an increase in the middle voltage occurs. However, such signal characteristics can change depending on the wiring of the photodiodes 14, and the above described signal characteristics are not always the case.

In FIG. 6, when the scale 13 moves from the "0" side to the "80" side of the graph, a decrease in the level of the middle voltage occurs first, and then an increase in the level of the middle voltage occurs. Such a decrease and an increase in the middle voltage level occur at times when the irreflexive portion 13b passes by the edge of the light receiving portion 12. Therefore, in the case where the light receiving portion 12 has six units, an increased portion and a decreased portion in the signal level appear at an interval corresponding to the six pitches.

Figure 7:
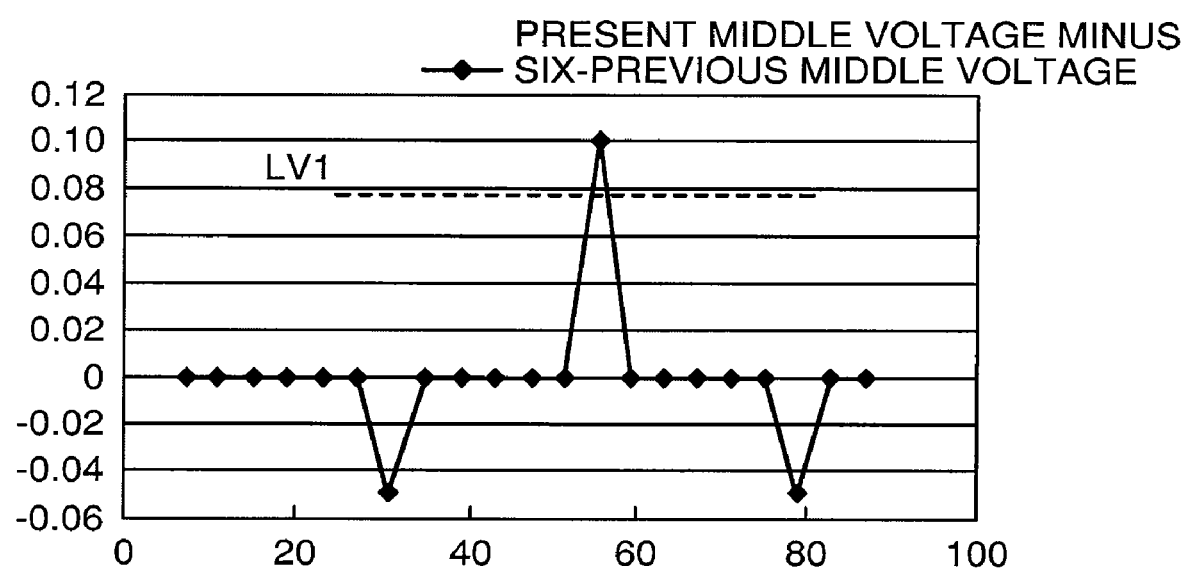
FIG. 7 is a graph showing changes in an origin signal which is a difference that a middle voltage (which is a middle voltage during changing from Amin to Amax) minus the sixth-previous middle voltage.

FIG. 7 is a graph showing the difference between the middle voltage data shown in FIG. 6 and the sixth-previous middle voltage data. As will be seen from FIG. 6, the increased portion and the decreased portion in the middle voltage appear at an interval of six (that is, the number of units), and accordingly, the aforementioned difference can show the position at which the signal changes in an exaggerated manner.

Thus, the origin position can be determined by specifying a point as the origin through a signal processing when the difference between the middle voltage data obtained and the sixth-previous middle voltage data exceeds a certain threshold level (LV1).

Figure 8:
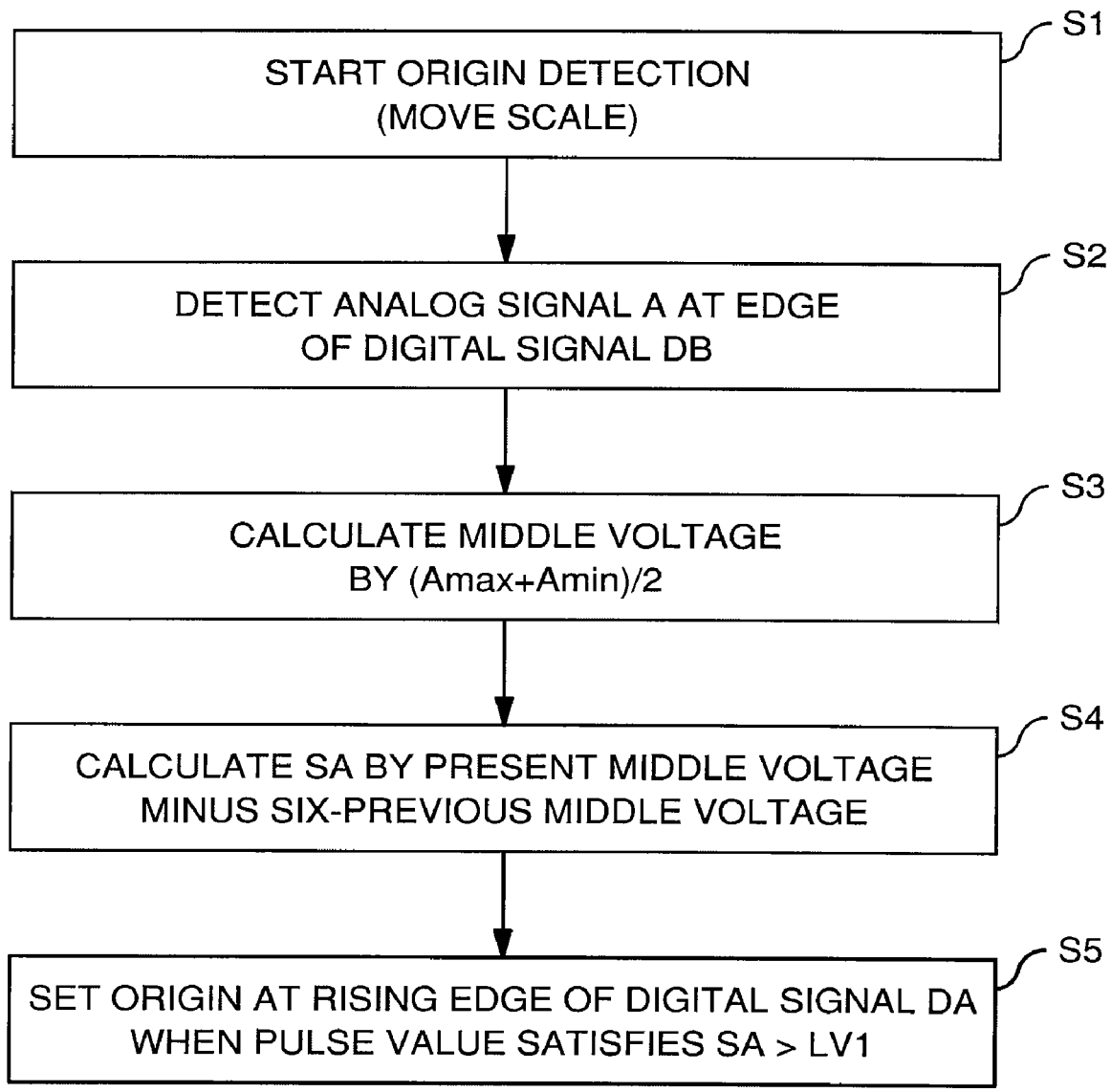
FIG. 8 is a flow chart of an origin detection algorithm.

FIG. 8 is a flow chart of the algorithm according to this detection method.

Step S1: Origin detection is started. The scale 13 is moved, and signals are generated.

Step S2: The maximum values Amax and the minimum values Amin of the A-phase analogue signal A are detected by detecting the value of the A-phase analogue signal A at timings of rising edges and trailing edges of the B-phase digital signal DB.

Step S3: The middle voltage of the A-phase analogue signal A is calculated as (Amax+Amin)/2.

Step S4: Value SA is calculated as the current middle voltage data minus the sixth-previous middle voltage data.

Step S5: The origin is set at the rising edge of the A-phase digital signal DA at the time when the pulse value satisfies the condition "SA> threshold level LV1".

By setting the origin position at a specific pulse edge of the digital signal in this way, the origin position can be determined with high accuracy.

In conventional methods, the position at which the middle voltage shows the maximum value Amax or the minimum value Amin is determined, data are stored over a certain range, and processing such as value comparison and differentiation of stored data is performed. Therefore, processing is complex.

In contrast, in this embodiment, it is sufficient only to simply check whether or not the difference between the current data and the sixth-previous data is larger than a certain threshold value. Thus, the origin position can be determined in a simple manner with reliability.

Although signal changes in the case where the number of the units of the photodiodes 14 is six has been described in the foregoing, if, for example, the number of the units in the light receiving portion 12 is five, the difference between the current data and the fifth-previous data should be calculated. In this way, which previous data is to be used in calculating the difference is determined depending on the number of units in the light receiving unit 12.

Second Embodiment

Figure 9:
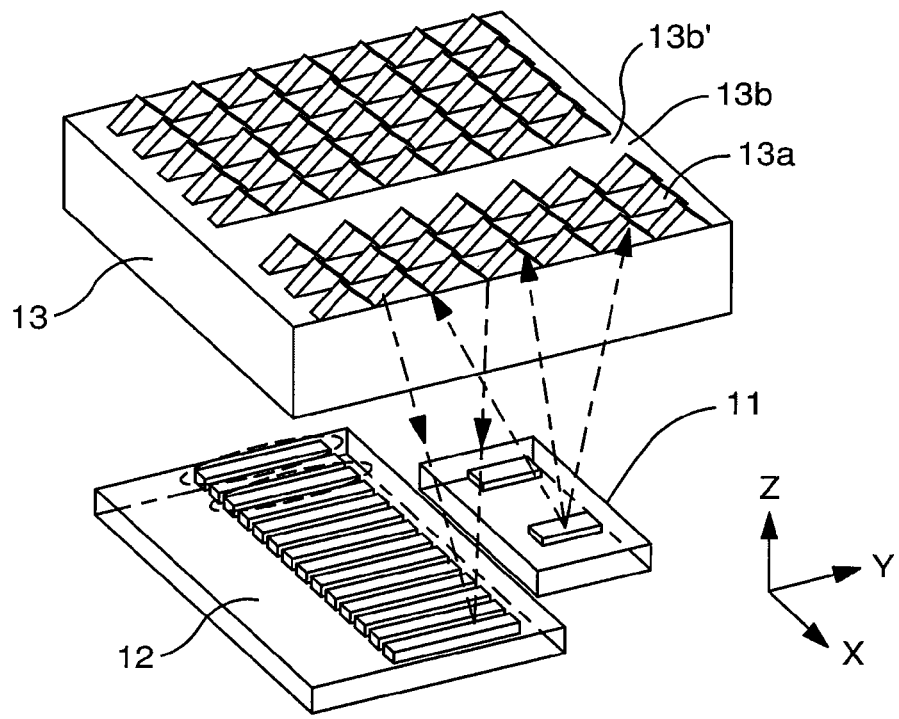
FIG. 9 schematically shows the structure of an encoder according to a second embodiment.

FIG. 9 schematically shows the structure of an encoder according to a second embodiment of the present invention. The scale 13 in the first embodiment shown in FIG. 1 is provided with one irreflexive portion or slit 13b, the scale 13 of the second embodiment is provided with two irreflexive portions 13b, 13b' arranged continuously.

Figure 10:
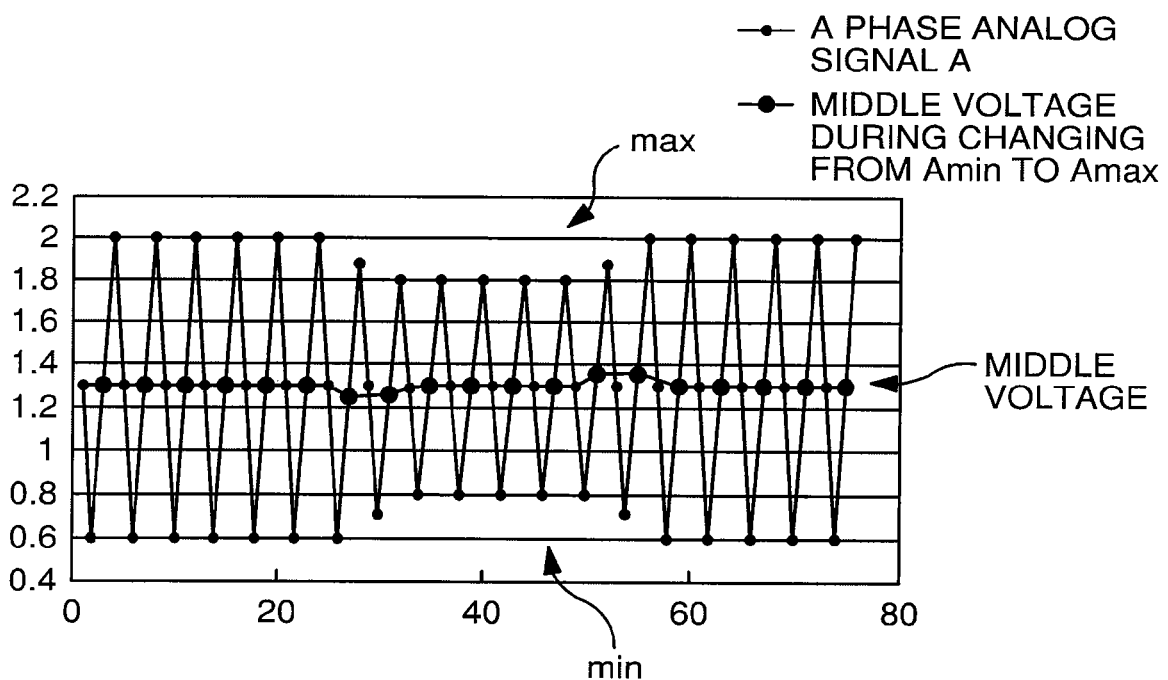
FIG. 10 is a graph showing changes in a signal at a time when a deficient slit passes by, which is detected by the processing circuit, and result of calculation.

FIG. 10 shows a signal waveform of the A-phase analogue signal A retrieved at pulse edges of the digital signals DA, DB and the middle voltage between the minimum value Amin and the maximum value Amax when the analogue signal A changes from the minimum value Amin to the maximum value Amax in the case where the scale is provided with two irreflexive portions 13b, 13b'.

Figure 11:
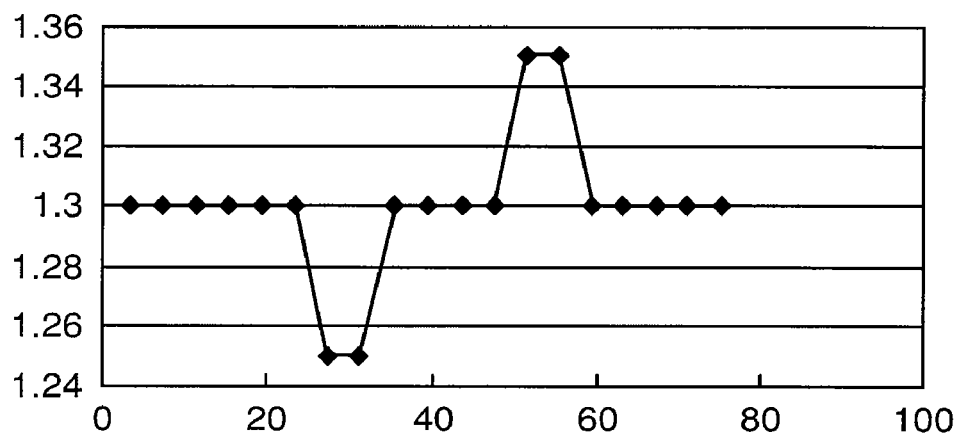
FIG. 11 is a graph showing changes in middle voltage.

FIG. 11 shows the middle voltage of the A-phase analogue signal in an enlarged manner. What is different in this graph from the corresponding graph in the first embodiment is that two successive decreased portions and two successive increased portions occur in the middle voltage. As will be seen from FIG. 11, the increased portion and the decreased portion in the middle voltage level appear at an interval of six (that is, the number of units), and the portion in which the reflexive portion is absent includes two sections. Therefore, the difference between the current data and the sixth-previous data shows a peak portion that includes two detection points.

Figure 12:
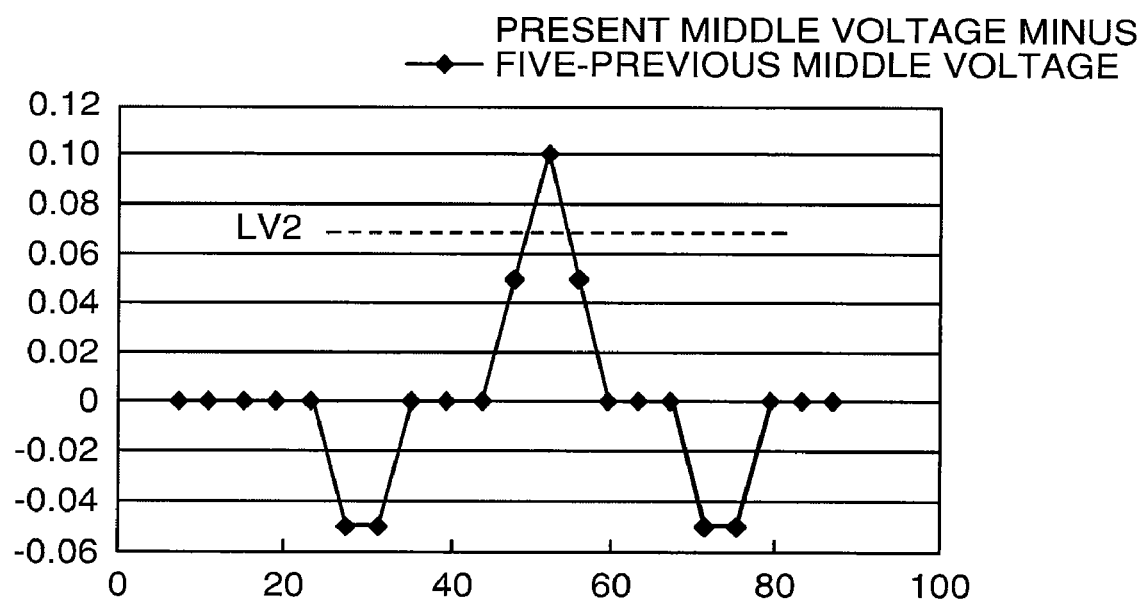
FIG. 12 is a graph showing changes in an origin signal which is a difference that a middle voltage (which is a middle voltage during changing from Amin to Amax) minus the sixth-previous middle voltage.

FIG. 12 is a graph showing the difference between the current data and the fifth-previous data. In the second embodiment, the difference between the current data and the fifth-previous data is calculated. In this case, the peak portion of the resultant detection signal includes one detection point, and the origin position can be determined. Thus, the origin position can be determined by signal processing as a point at which the difference between the middle voltage data obtained and the fifth-previous middle voltage data exceeds a certain threshold level (LV2).

In the case where the difference between the current data and the n-th-previous data is calculated, it is necessary for the calculation circuit to store n data. Therefore, the larger the number n is, the larger storage capacity the calculation circuit is required to have. In the second embodiment, the required storage capacity can be reduced by providing two irreflexive portions 13b, 13b', and the calculation circuit can be made simpler.

In this embodiment, a calculation method for determining the one origin position per one rotation of the scale 13 has been described. However, in the case where the difference between the current data and the sixth-previous data is calculated, an origin signal including two pulses is obtained per one rotation of the scale 13, and the signal may be subjected to calculation so that it is used as a zone signal.

Although in this embodiment, the difference is calculated for data with an interval equal to "(the number of units)−(the number of irreflexive portions)+1", the origin position can be determined from the difference between data with an interval equal to "(the number of units)+(the number of irreflexive portions)−1".

Third Embodiment

In the first and second embodiments, the middle voltage is calculated as (Amin+Amax)/2 based on data in the section in which the A-phase analogue signal A changes from the minimum value Amin to the maximum value Amax.

However, when the moving direction of the scale 13 is reversed, without paying attention to whether the data are in an interval in which the signal changes from the minimum value to the maximum value during the scale rotates in a certain direction when retrieving the data, data may be sampled during the scale 13 rotates in the reverse direction.

Figure 13:
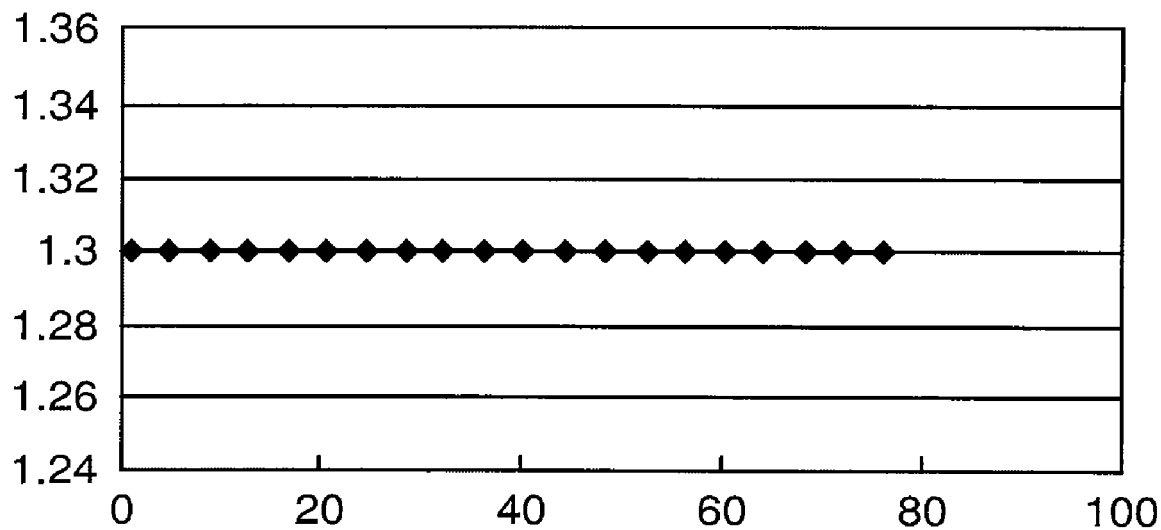
FIG. 13 is a graph showing changes in middle voltage in a third embodiment.

Therefore, when calculating the value (Amin+Amax)/2 based on data in FIG. 5, if a minimum value and its immediately subsequent maximum value in FIG. 5 viewed in the reverse direction of time are adopted (that is, a minimum value and its immediately previous maximum value are actually adopted) for the calculation) changes in the middle voltage do not appear as shown in FIG. 13.

Therefore, it is necessary to settle the order of retrieving data to, for example, the order from the minimum value Amin to the maximum value Amax so that the calculation of the middle voltage (Amin+A max)/2 is performed surely based on data in a section in which the A-phase analogue signal A changes from the minimum value Amin to maximum value Amax. Therefore it is necessary to provide means for determining whether the data that is obtained first is data of the minimum value Amin or data of the maximum value Amax. This makes the circuit or the calculation unit complex.

The third embodiment is intended to eliminate the above descried problem. The value (Amin+Amax)/2 is calculated from both of data in sections in which the A-phase analogue signal changes from the minimum value Amin to the maximum value Amax and data in sections in which the A-phase analogue signal changes from the maximum value Amax to the minimum value Amin, and the values (Amin+Amax)/2 calculated from both types of data are used as input data.

Furthermore, in the case where the light receiving portion 12 includes six units, the difference between the current data and the twelfth-previous data is calculated, in contrast to the first embodiment where the difference between the current data and the sixth-previous data is calculated.

Figure 14:
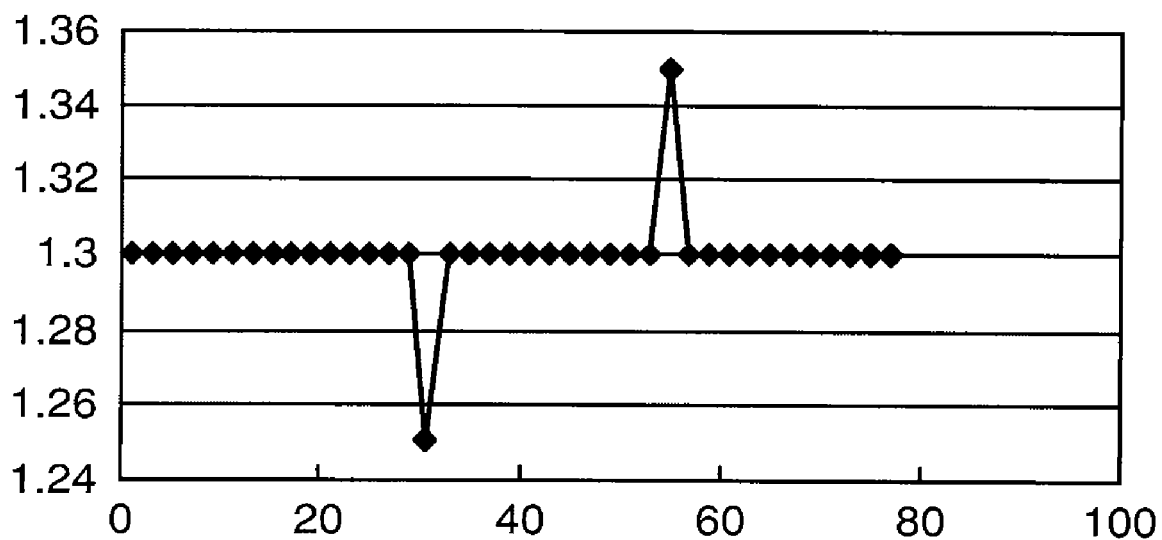
FIG. 14 is a graph showing changes in the middle voltage.

FIG. 14 is a graph showing the middle voltage calculated based on data in both sections in which the A-phase analogue signal A changes from the minimum value Amin to the maximum value Amax and sections in which the A-phase analogue signal A changes from the maximum value Amax to the minimum value Amin. By retrieving the data from both sections, changes in the middle voltage appear surely.

Figure 15:
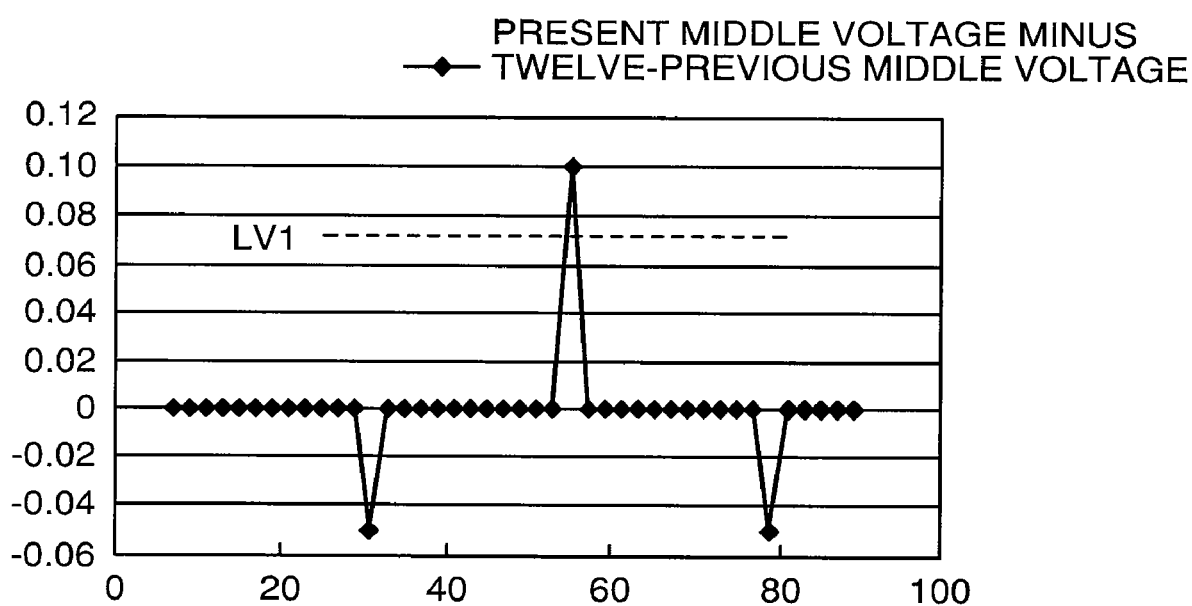
FIG. 15 is a graph showing changes in an origin signal which is a difference that a middle voltage (which is a middle voltage during changing from Amin to Amax) minus the twelfth-previous middle voltage.
Figure 16:
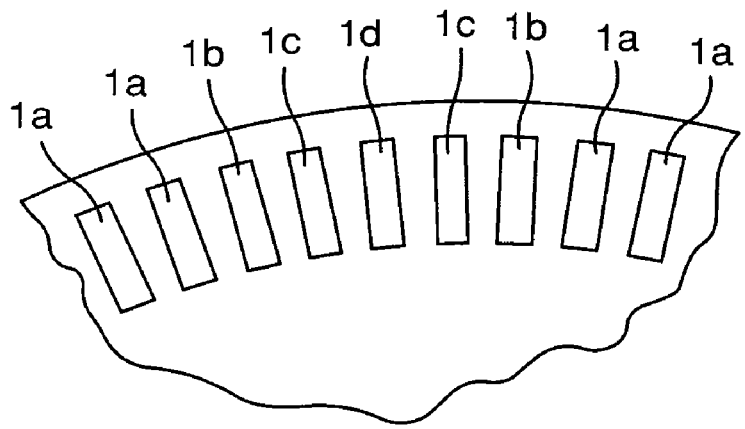
FIG. 16 schematically illustrates the structure of a scale portion of a conventional optical encoder.
Figure 17:
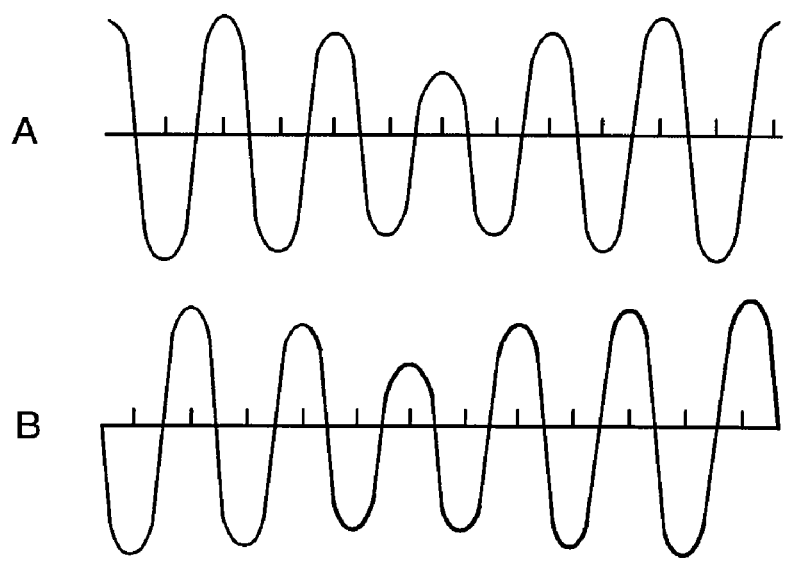
FIG. 17 shows waveforms of signals output from an encoder when a portion of a scale in which the transmittance varies is passing by a sensor.

FIG. 15 is a graph showing the difference between the current data and the twelfth-previous data calculated based on the series of data shown in FIG. 14. In the graph of FIG. 15, the calculated difference becomes large at the origin. Thus, the origin position is determined by the processing circuit as a point at which the difference between the current data and the twelfth-previous data exceeds a certain threshold level (LV1).

Therefore, resetting of the counter at the origin position can be performed, and an origin signal can be output in synchronization with the A-phase analogue signal A at that time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-257199, filed Sep. 22, 2006, which is hereby incorporated by reference herein in its entirety.

What is claimed is:

1. An optical encoder provided with an origin detection unit, comprising:
   a scale having an optical grating portion provided with an optically discontinuous portion;
   a light receiving unit including a plurality of units of light receiving elements, each of the units of the light receiving elements having the same number of light receiving elements, the light receiving unit being provided in association with a pitch of the optical grating and movable relative to the scale;
   a calculation unit that detects a change of a signal from the light receiving unit over a predetermined length of section that occurs when a light beam, which illuminates the discontinuous portion of the scale and is reflected thereon, is incident on the light receiving unit, performs calculation based on the change, and detects an origin position based on the result of the calculation,
   wherein in one cycle of signals which are output from the light receiving unit and have a predetermined interval which is determined based on a relationship between the number of units of the light receiving elements in the light receiving unit and the size of the discontinuous portion of the scale, either a middle voltage of a section during which a detection signal changes from a minimum value to a maximum value or a middle voltage of a section during which the detection signal changes from a maximum value to a minimum value is obtained, and
   wherein the middle voltage is retrieved every time when the scale moves by one pitch, the origin position is detected by a calculation based on two middle voltages apart from each other by "(a number of units in the light receiving unit)+n−1" pitches, where n represents a width of the discontinuous portion in terms of a number of light-and-shade slits on the scale.

2. An optical encoder provided with an origin detection unit, comprising:
   a scale having an optical grating portion provided with an optically discontinuous portion;
   a light receiving unit including a plurality of units of light receiving elements, each of the units of the light receiving elements having the same number of light receiving elements, the light receiving unit being provided in association with a pitch of the optical grating and movable relative to the scale;
   a calculation unit that detects a change of a signal from the light receiving unit over a predetermined length of section that occurs when a light beam, which illuminates the discontinuous portion of the scale and is reflected thereon, is incident on the light receiving unit, performs calculation based on the change, and detects an origin position based on the result of the calculation,
   wherein in one cycle of signals which are output from the light receiving unit and have a predetermined interval which is determined based on a relationship between the number of units of the light receiving elements in the light receiving unit and the size of the discontinuous portion of the scale, either a middle voltage of a section during which a detection signal changes from a minimum value to a maximum value or a middle voltage of a section during which the detection signal changes from a maximum value to a minimum value is obtained, and
   wherein the middle voltage is retrieved every time when the scale moves by one pitch, the origin position is detected by a calculation based on two middle voltages apart from each other by "(a number of units in the light receiving unit)−n+1" pitches, where n represents a width of the discontinuous portion in terms of a number of light-and-shade slits on the scale.

3. An optical encoder provided with an origin detection unit, comprising:

a scale having an optical grating portion provided with an optically discontinuous portion;

a light receiving unit including a plurality of units of light receiving elements, each of the units of the light receiving elements having the same number of light receiving elements, the light receiving unit being provided in association with a pitch of the optical grating and movable relative to the scale;

a calculation unit that detects a change of a signal from the light receiving unit over a predetermined length of section that occurs when a light beam, which illuminates the discontinuous portion of the scale and is reflected thereon, is incident on the light receiving unit, performs calculation based on the change, and detects an origin position based on the result of the calculation, wherein in one cycle of signals which are output from the light receiving unit and have a predetermined interval which is determined based on a relationship between the number of units of the light receiving elements in the light receiving unit and the size of the discontinuous portion of the scale, both a middle voltage of a section during which a detection signal changes from a minimum value to a maximum value and a middle voltage of a section during which the detection signal changes from a maximum value to a minimum value are obtained, and wherein the middle voltage is retrieved every time when the scale moves by one pitch, the origin position is detected by a calculation based on two middle voltages apart from each other by "2×(a number of units in the light receiving unit)+n−1" pitches, where n represents a width of the discontinuous portion in terms of a number of light-and-shade slits on the scale.

4. An optical encoder provided with an origin detection unit, comprising:

a scale having an optical grating portion provided with an optically discontinuous portion;

a light receiving unit including a plurality of units of light receiving elements, each of the units of the light receiving elements having the same number of light receiving elements, the light receiving unit being provided in association with a pitch of the optical grating and movable relative to the scale;

a calculation unit that detects a change of a signal from the light receiving unit over a predetermined length of section that occurs when a light beam, which illuminates the discontinuous portion of the scale and is reflected thereon, is incident on the light receiving unit, performs calculation based on the change, and detects an origin position based on the result of the calculation, wherein in one cycle of signals which are output from the light receiving unit and have a predetermined interval which is determined based on a relationship between the number of units of the light receiving elements in the light receiving unit and the size of the discontinuous portion of the scale, both a middle voltage of a section during which a detection signal changes from a minimum value to a maximum value and a middle voltage of a section during which the detection signal changes from a maximum value to a minimum value are obtained, and wherein the middle voltage is retrieved every time when the scale moves by one pitch, the origin position is detected by a calculation based on two middle voltages apart from each other by "2×(a number of units in the light receiving unit)−n+1" pitches, where n represents a width of the discontinuous portion in terms of a number of light-and-shade slits on the scale.

* * * * *